(No Model.)

J. W. MOCK.
VEHICLE BRAKE.

No. 592,993. Patented Nov. 2, 1897.

Witnesses
C. Bradway.
N. F. Riley.

Inventor
James W. Mock.
By his Attorneys,
C. A. Snow & Co.

UNITED STATES PATENT OFFICE.

JAMES WILSON MOCK, OF MORGANTOWN, NORTH CAROLINA.

VEHICLE-BRAKE.

SPECIFICATION forming part of Letters Patent No. 592,993, dated November 2, 1897.

Application filed April 29, 1897. Serial No. 634,397. (No model.)

*To all whom it may concern:*

Be it known that I, JAMES WILSON MOCK, a citizen of the United States, residing at Morgantown, in the county of Burke and State of North Carolina, have invented a new and useful Vehicle-Brake, of which the following is a specification.

This invention relates to certain improvements in vehicle-brakes, and especially that class of brakes which are adapted for use in connection with wagons, being arranged to be operated automatically by the movement of the vehicle toward the horses upon a downgrade; and the object of the invention is to provide a device of this character of a simple and inexpensive nature which shall be strong and durable in construction and not liable to become deranged, so as to be inoperative when required for use.

The invention consists in a brake comprising a brake-beam having shoes and adapted for movement to engage said shoes with the wheels, a lever adapted to be swung by the movement of the vehicle toward the horses, a connection between said lever and the brake-beam whereby the brake-beam is moved, and means to engage said connection and lock the parts against movement.

The invention also contemplates certain novel features of construction, combination, and arrangement of the various parts of the improved brake, whereby certain important advantages are attained and the device is made simpler, cheaper, and otherwise better adapted and more convenient for use, all as will be hereinafter fully set forth.

The novel features of the invention will be carefully defined in the claims.

In order that my improvements may be the better understood, I have shown in the accompanying drawings a vehicle provided with a brake constructed according to my invention, the front portion only of the vehicle and running-gear being shown, in which drawings—

Figure 1:
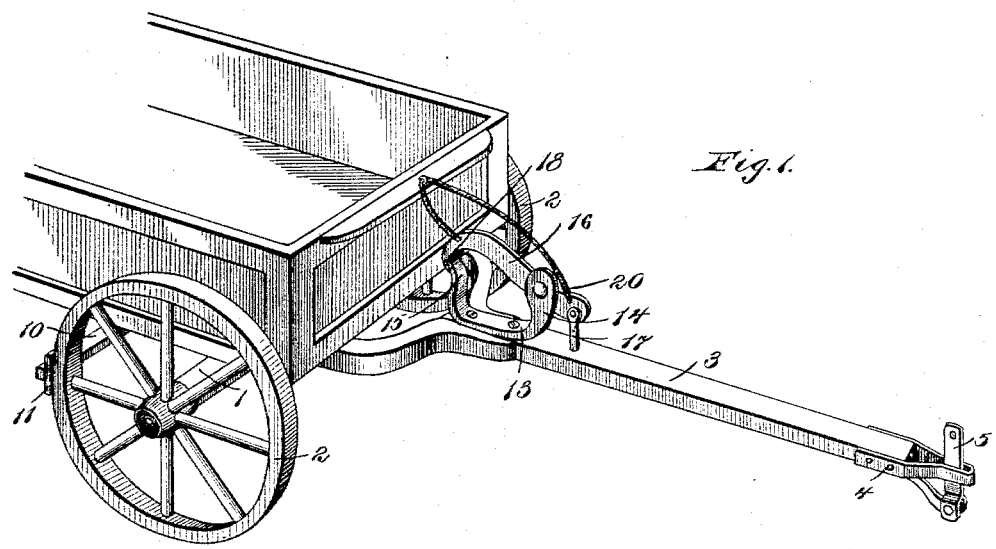
Figure 2:
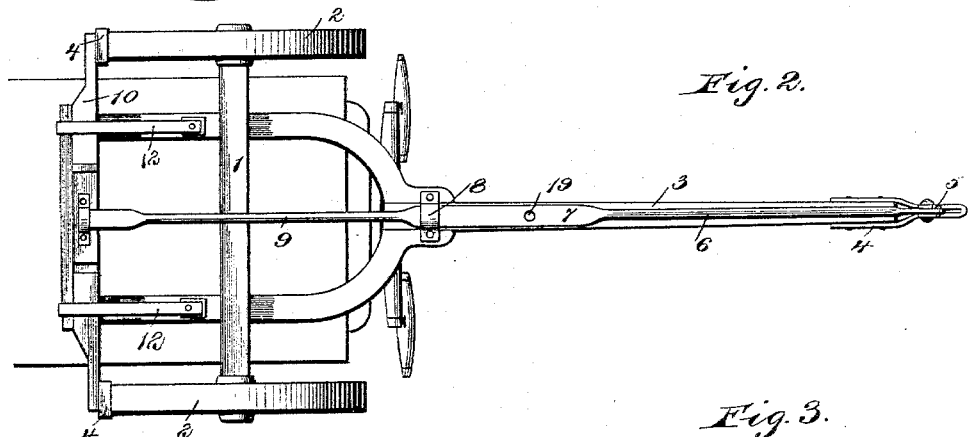
Figure 3:
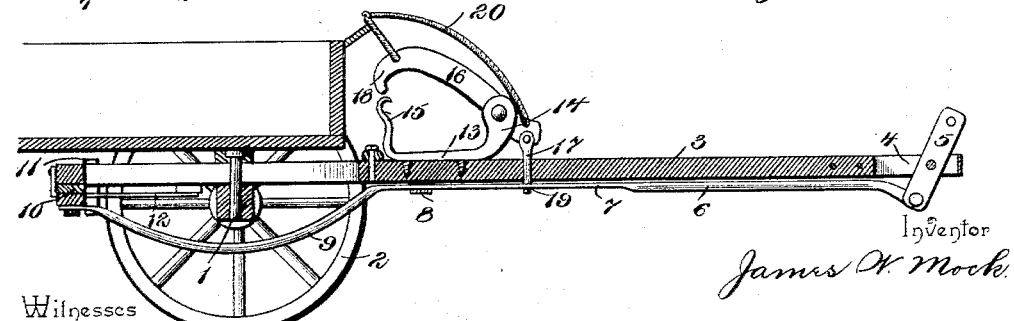

Figure 1 is a perspective view of the device. Fig. 2 is a plan view of the same. Fig. 3 is a sectional view taken longitudinally through the tongue of the device and showing the brake mechanism in position.

In the views, 1 indicates the front axle of the vehicle, having wheels 2 at its ends, and 3 indicates the pole or tongue, connected with said axle in the ordinary way. The front end or extremity of the pole or tongue 3 is provided with a clip or equivalents 4, wherein is held pivotally a lever 5, adapted at its upper end for connection with the forward part of the harness or with a neck-yoke, as will be readily understood.

The lever 5 has its lower end projecting below the tongue or pole 3, and said lower end is coupled loosely to the forward end of a connecting rod or bar 6, which extends along under the pole or tongue 3 and is formed of a metal bar or rod of circular cross-section having a flattened portion 7 mounted to slide or move in guides 8 on the under side of said pole or tongue, the rear end of the rod or bar 6 being bent down, as indicated at 9, beneath the front axle 1 and being connected at its rear extremity to the under side of the brake-beam 10.

The brake-beam 10 extends transversely of the wagon and carries at its ends shoes 11, adapted for engagement with the front wheels 2 upon the ends of the vehicle-axle 1, and said brake-beam is adapted for movement forward and back, being mounted in guides formed of metal straps 12, so as to cause the shoes 11, carried on the ends of the brake-beam, to be engaged and withdrawn from engagement with the wheels 2.

On the tongue or pole 3 in front of the wagon-body is mounted a bracket or clip 13, secured at its central portion to said pole or tongue and having its forward end bent up, as indicated at 14, to form an arm and its rear end also bent up and formed into a spring 15, the extremity of which is curved to provide a shoulder. I do not wish to limit myself to this integral formation of the spring 15, since it is evident that said spring may be formed separately from and secured to the bracket or clip 13.

On the upturned forward end 14 of the bracket or clip 13 is pivotally mounted a latch-lever 16, the forward end of which carries a pivoted dog 17, arranged to play in an opening formed vertically through the pole or tongue 3, while the rear end of said lever is provided with a depending hook or projection 18, adapted for engagement with the bend of the curved upper end of the spring 15 at the rear end of the bracket or clip 13, the construction and arrangement of the spring 15 and of said hook or projection 18 being such that when the hook is engaged with the spring the lever 16 will be held with its rear end in a lowered position and its forward end raised.

The pivoted dog 17 is arranged to play vertically in the pole or shaft at a point immediately over the flattened portion 7 of the rod or bar 6, which connects the lever 5 at the forward end of the tongue or pole with the brake-beam, and said flattened portion 7 is formed with an opening or stay 19, adapted to be engaged by the lower end of the pivoted dog 17 when the forward end of the lever 16 is depressed, as shown in Fig. 3, said opening or stay 19 being so located that it will be brought into line with the lower end of the pivoted dog when the brake-beam is moved rearwardly, so as to disengage its shoes 11 from the wheels 2 of the vehicle.

To opposite ends of the latch-lever 16 are connected chains or cords 20, which extend up within convenient reach of the driver, and by means of these chains or cords 20 it will be seen that the said lever 16 may be swung pivotally, so as to raise and lower its forward end to move the pivoted dog into and out of engagement with the opening or stay 19 in the flattened portion 7 of the rod or bar 6, the said latch-lever being normally held with its dog out of engagement with said opening or seat by the engagement of the hook 18 at the rear end of the lever with the curved or bent upper end of the spring 15 at the rear end of the bracket or clip to which the latch-lever is pivoted.

In practice the latch-lever will be normally held with its forward end and the dog connected therewith in raised position out of engagement with the flattened portion of the bar or rod 6, so that when the vehicle is upon a downgrade the movement of the vehicle toward the horses will automatically act to swing the lever 5 pivotally and apply the brake, and when it is desired to back the vehicle it is only necessary to lower the forward end of the latch-lever by pulling upward on the cord or chain 20 at the rear end thereof, so as to lower the forward end of the latch-lever and cause the dog connected therewith to engage the stay or opening 19 in the bar 6.

From the above description it will be seen that the improved brake constructed according to my invention is of an extremely simple and inexpensive nature and is especially well adapted for the purposes for which it is designed, and it will also be obvious from the above description that the invention is capable of considerable modification without material departure from its principles and spirit, and for this reason I do not wish to be understood as limiting myself to the precise form and arrangement of the parts herein set forth.

Having thus described my invention, I claim—

1. In a vehicle-brake, the combination with a running-gear, of a brake-beam having shoes to engage the wheels, a lever mounted on the tongue and adapted to be swung by the movement of the vehicle toward the horses, when on a downgrade, a connection between the lever and the brake-beam, a bracket mounted on the tongue and provided at its front with an upwardly-extending arm and having a similarly-disposed spring at its back, a pin passing through the tongue and adapted to engage the connection between the lever and the brake-beam to lock the same against movement, and a lever fulcrumed between its ends on said arm, connected at its front end to said pin and having its rear end arranged to be engaged by the spring, whereby the pin is held elevated, substantially as described.

2. In a vehicle-brake, the combination with a running-gear, of a brake-beam mounted thereon and provided with brake-shoes, operating mechanism extending along the tongue and connected with the brake-beam, a pin mounted on the tongue and arranged to engage the operating mechanism, a bracket secured to the tongue and provided at its front with an integral upwardly-extending arm and having at its back an integral similarly-disposed spring curved at its upper end to form a shoulder, and a lever fulcrumed between its ends on said arm, connected at its front end to the pin and provided at its rear end with a dog adapted to engage the curved portion of the spring, substantially as described.

In testimony that I claim the foregoing as my own I have hereto affixed my signature in the presence of two witnesses.

JAMES WILSON MOCK.

Witnesses:
J. C. ESTES,
W. S. McRARY.